(12) United States Patent
Sodagar

(10) Patent No.: US 12,113,878 B2
(45) Date of Patent: Oct. 8, 2024

(54) METHODS AND SYSTEMS FOR SCHEDULING A WORKFLOW

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/704,688

(22) Filed: Mar. 25, 2022

(65) Prior Publication Data
US 2023/0021104 A1     Jan. 19, 2023

Related U.S. Application Data

(60) Provisional application No. 63/218,809, filed on Jul. 6, 2021.

(51) Int. Cl.
H04L 67/62     (2022.01)

(52) U.S. Cl.
CPC .................................. H04L 67/62 (2022.05)

(58) Field of Classification Search
CPC ...................................................... H04L 67/62
See application file for complete search history.

(56) References Cited

U.S. PATENT DOCUMENTS

| | | | |
|---|---|---|---|
| 2016/0234267 A1* | 8/2016 | Hebbar | H04N 21/26258 |
| 2021/0004273 A1* | 1/2021 | You | G06F 9/5027 |
| 2021/0105338 A1 | 4/2021 | Oyman et al. | |
| 2022/0109722 A1* | 4/2022 | You | G06F 9/5072 |
| 2022/0217195 A1* | 7/2022 | You | H04L 65/61 |

FOREIGN PATENT DOCUMENTS

JP     2016-507121 A     3/2016

OTHER PUBLICATIONS

International Search Report dated Jul. 27, 2022 in International Application No. PCT/US22/22117.
Written Opinion of the International Searching Authority dated Jul. 27, 2022 in International Application No. PCT/US22/22117.
"Text of ISO/IEC FDIS 23090-8 Network-based media processing", Systems Subgroup, ISO/IEC JTC 1/SC 29/WG 11 N19062, Coding of Moving Pictures and Audio, Jan. 2020, pp. 1-105, Brussels, BE.
Extended European Search Report dated Dec. 12, 2023 in European Application No. 22838170.3.
Iraj Sodagar (Live), "[32.1] [NBMP] Defects of 23090-8 FDIS", MPEG Meeting; Jun. 29, 2020-Jul. 3, 2020, ISO/IEC JTC1/SC29/WG11, Jun. 2020, No. m54482, xp030288906, pp. 1-95 (105 p. total).
Office Action issued Mar. 18, 2024 in Japanese Application No. 2023-521786.
Nishida, et al., "Technology Supporting Big Data", Web+DB Press plus, Technologies, 2nd Edition, Feb. 25, 2021, Chapter 5, pp. 192-233 (49 pages).

* cited by examiner

*Primary Examiner* — Hua Fan
(74) *Attorney, Agent, or Firm* — Sughrue Mion, PLLC (57) ABSTRACT

Systems and methods for scheduling a network-based media processing (NBMP) workflow based on a scheme mode are provided. The scheme mode may be obtained by a NBMP workflow manager based on received information that indicates the scheme mode. The NBMP workflow manager may schedule tasks of the NBMP workflow to be executed to process media in accordance with the scheme mode indicated in the information. The scheme mode may be a by order mode, a by duration mode, a by event mode, or a by timeslot mode.

19 Claims, 5 Drawing Sheets

METHODS AND SYSTEMS FOR SCHEDULING A WORKFLOW

CROSS-REFERENCE TO THE RELATED APPLICATION

This application claims priority from U.S. Provisional Application No. 63/218,809, filed on Jul. 6, 2021, the disclosure of which is incorporated herein by reference in its entirety.

FIELD

Embodiments of the present disclosure are directed to a set of various schemes for scheduling a workflow or parts of the workflow on cloud platforms.

BACKGROUND

Network and cloud platforms are used to run various applications. The network-based media processing (NBMP) standard defines a specification for defining, instantiating, and running workflows on cloud platforms. However, the existing standard does not define methods for scheduling a workflow, or parts of it.

SUMMARY

In some use cases, a workflow can be run in parts, task by task, or a group of tasks at each time. In such an application, real-time processing may not be a requirement and for reasons such as limited computational resources allocated for the workflow or to avoid peak traffic time on the cloud, a workflow may be needed to be scheduled.

Embodiments of the present disclosure solve the above problems and/or other problems.

According to embodiments, a method performed by at least one processor that implements a NBMP workflow manager is provided. The method includes: receiving information indicating a scheme mode for scheduling a NBMP workflow; obtaining the scheme mode based on the information; scheduling tasks of the NBMP workflow to be executed to process media in accordance with the scheme mode indicated in the information, wherein the scheme mode indicated in the information is: a first scheme mode in which each task of the NBMP workflow is executed once for an entirety of an input of the task, a second scheme mode in which each task of the NBMP workflow is executed for a predetermined duration of the input of the task or for a predetermined duration of an output of the task, a third scheme mode in which each task of the NBMP workflow is started based on a start event or stopped based on a stop event, or a fourth scheme mode in which each task of the NBMP workflow is started according to a predetermined schedule, wherein the predetermined schedule includes time slots for executing the tasks.

According to one or more embodiments, the scheme mode indicated in the information is the first scheme mode.

According to one or more embodiments, the scheme mode indicated in the information is the second scheme mode.

According to one or more embodiments, the method further includes receiving additional information indicating the predetermined duration of the input of each task or the predetermined duration of the output of each task, wherein the scheduling the tasks of the NBMP workflow includes scheduling the tasks of the NBMP workflow based on the additional information.

According to one or more embodiments, the scheme mode indicated in the information is the third scheme mode.

According to one or more embodiments, the method further includes obtaining the start event or the stop event by: receiving additional information indicating the start event or the stop event, or generating the start event or the stop event, wherein the scheduling the tasks of the NBMP workflow includes scheduling at least one of the tasks of the NBMP workflow to be started based on the start event that is obtained or stopped based on the stop event that is obtained.

According to one or more embodiments, the scheduling the tasks of the NBMP workflow includes changing a state of at least one of the tasks of the NBMP workflow to a paused state.

According to one or more embodiments, the scheme mode indicated in the information is the fourth scheme mode.

According to one or more embodiments, the method further includes receiving additional information indicating a scheduling mode of at least one task of the NBMP workflow, wherein the scheduling mode is one from among: a first scheduling mode that indicates that a timeslot of the at least one task within the predetermined schedule is explicitly signaled to the NBMP workflow manager, or a second scheduling mode that indicates that the NBMP workflow manager obtains the timeslot through inference.

According to one or more embodiments, the method further includes sending information indicating whether the NBMP workflow manager supports the scheme mode.

According to one or more embodiments, the method further includes: sending, to an NBMP client, information indicating capabilities of the NBMP workflow manager, based on receiving a workflow description document (WDD) from the NBMP client that includes a parameter that has a value that indicates that the capabilities of the NBMP workflow manager are requested.

According to one or more embodiments, the method further includes scheduling the NBMP workflow based on receiving a workflow description document (WDD) that includes information indicating the NBMP workflow, or the method further includes scheduling a group of tasks based on receiving a task group object that indicates the group of tasks, or the scheduling the tasks includes scheduling a task based on receiving a task description document (TDD) that indicates the task.

According to one or more embodiments, the method further includes: sending, to an NBMP client, information indicating whether the NBMP workflow manager can schedule the NBMP workflow, a group of tasks, or a task, based on receiving a parameter from the NBMP client that has a value that indicates that the NBMP client requests to investigate whether the NBMP workflow manager can accommodate scheduling of the NBMP workflow, the group of tasks, or the task.

According to embodiments, a system is provided. The system includes: at least one memory configured to store computer program code; and at least one processor configured to access the computer program code and operate as instructed by the computer program code, the computer program code including: obtaining code configured to cause a NBMP workflow manager, implemented by the at least one processor, to obtain a scheme mode for scheduling a NBMP workflow, the scheme mode obtained based on received information that indicates the scheme mode; and scheduling code configured to cause the NBMP workflow manager to schedule tasks of the NBMP workflow to be executed to process media in accordance with the scheme mode indicated in the received information, wherein the scheme mode indicated in the received information is: a first scheme mode in which each task of the NBMP workflow is executed once for an entirety of an input of the task, a second scheme mode in which each task of the NBMP workflow is executed for a predetermined duration of the input of the task or for a predetermined duration of an output of the task, a third scheme mode in which each task of the NBMP workflow is started based on a start event or stopped based on a stop event, or a fourth scheme mode in which each task of the NBMP workflow is started according to a predetermined schedule, wherein the predetermined schedule includes time slots for executing the tasks.

According to one or more embodiments, the scheme mode indicated in the received information is the first scheme mode.

According to one or more embodiments, the scheme mode indicated in the received information is the second scheme mode.

According to one or more embodiments, the scheduling code is further configured to cause the NBMP workflow manager to schedule the tasks of the NBMP workflow based on additional received information that indicates the predetermined duration of the input of each task or the predetermined duration of the output of each task.

According to one or more embodiments, the scheme mode indicated in the received information is the third scheme mode.

According to one or more embodiments, the start event or the stop event is obtained by the NBMP workflow manager.

According to one or more embodiments, the scheduling code is further configured to cause the NBMP workflow manager to change a state of at least one of the tasks of the NBMP workflow to a paused state.

According to one or more embodiments, the scheme mode indicated in the received information is the fourth scheme mode.

According to one or more embodiments, the scheduling code is further configured to cause the NBMP workflow manager to schedule at least one task of the NBMP workflow to be executed in accordance with a scheduling mode that is indicated by additional information received by the NBMP workflow manager, wherein the scheduling mode is one from among: a first scheduling mode that indicates that a timeslot of the at least one task within the predetermined schedule is explicitly signaled to the NBMP workflow manager, or a second scheduling mode that indicates that the NBMP workflow manager obtains the timeslot through inference.

According to one or more embodiments, the computer program code further includes: response code configured to cause the NBMP workflow manager to send, to an NBMP client, information indicating capabilities of the NBMP workflow manager, based on receiving a workflow description document (WDD) from the NBMP client that includes a parameter that has a value that indicates that the capabilities of the NBMP workflow manager are requested.

According to one or more embodiments, the scheduling code is further configured to cause the NBMP workflow manager to: schedule the NBMP workflow based on receiving a workflow description document (WDD) that includes information indicating the NBMP workflow; or schedule a group of tasks based on receiving a task group object that indicates the group of tasks; or schedule a task based on receiving a task description document (TDD) that indicates the task.

According to one or more embodiments, the computer program code further includes: response code configured to cause the NBMP workflow manager to send, to an NBMP client, information indicating whether the NBMP workflow manager can schedule the NBMP workflow, a group of tasks, or a task, based on receiving a parameter from the NBMP client that has a value that indicates that the NBMP client requests to investigate whether the NBMP workflow manager can accommodate scheduling of the NBMP workflow, the group of tasks, or the task.

According to embodiments, a non-transitory computer-readable medium storing computer code is provided. The computer code is configured to, when executed by at least one processor, cause the at least one processor to implement a NBMP workflow manager that: obtains a scheme mode for scheduling a NBMP workflow, the scheme mode obtained based on received information that indicates the scheme mode; and schedules tasks of the NBMP workflow to be executed to process media in accordance with the scheme mode indicated in the received information, wherein the scheme mode indicated in the received information is: a first scheme mode in which each task of the NBMP workflow is executed once for an entirety of an input of the task, a second scheme mode in which each task of the NBMP workflow is executed for a predetermined duration of the input of the task or for a predetermined duration of an output of the task, a third scheme mode in which each task of the NBMP workflow is started based on a start event or stopped based on a stop event, or a fourth scheme mode in which each task of the NBMP workflow is started according to a predetermined schedule, wherein the predetermined schedule includes time slots for executing the tasks.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
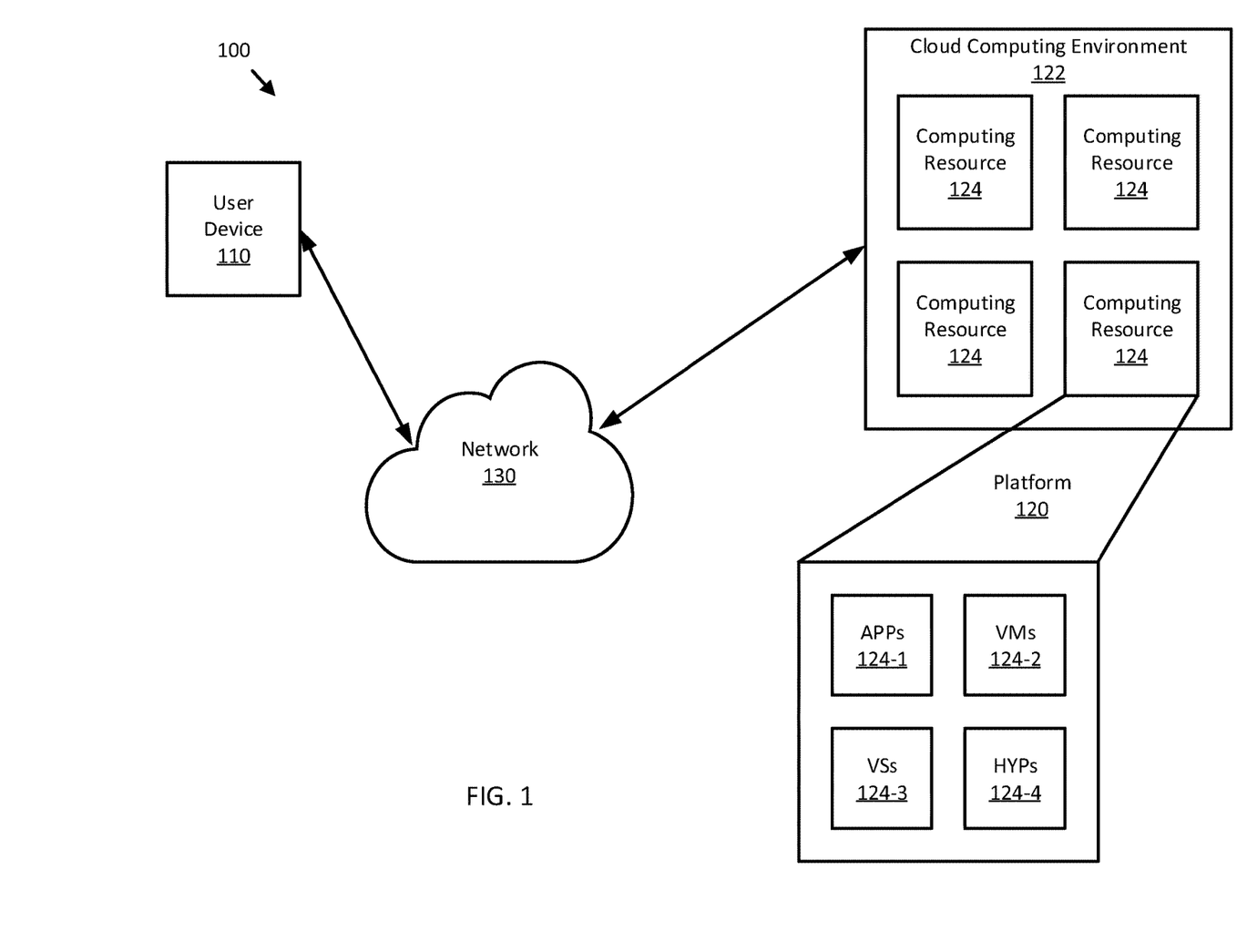
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
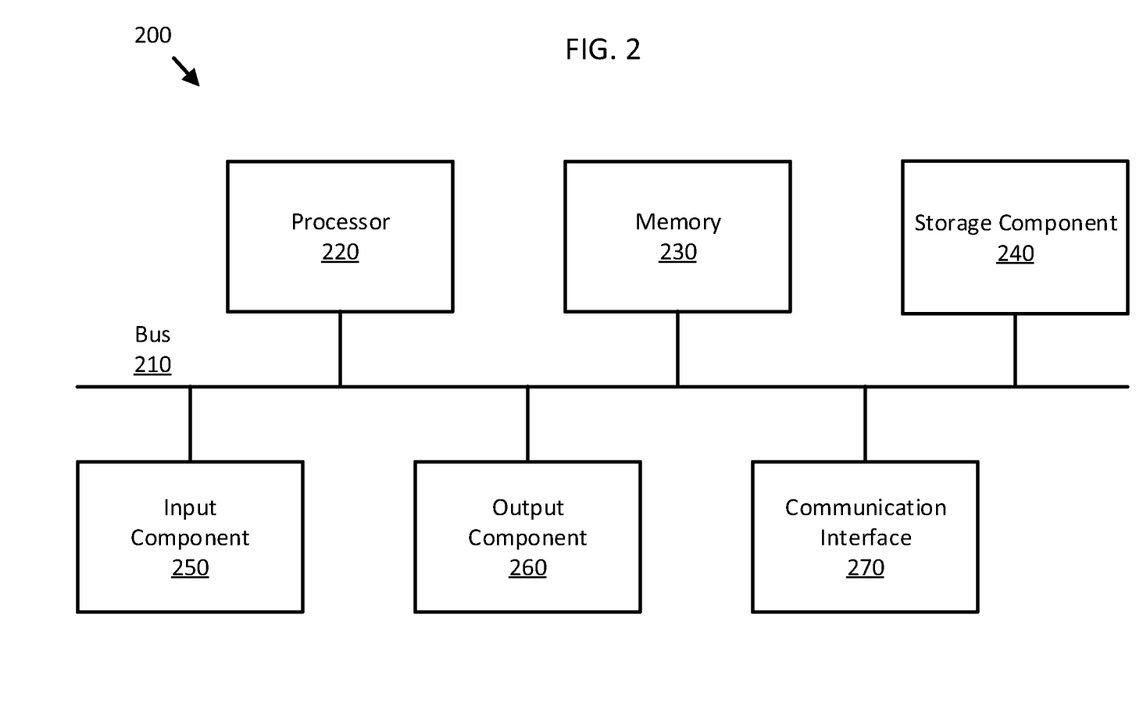
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
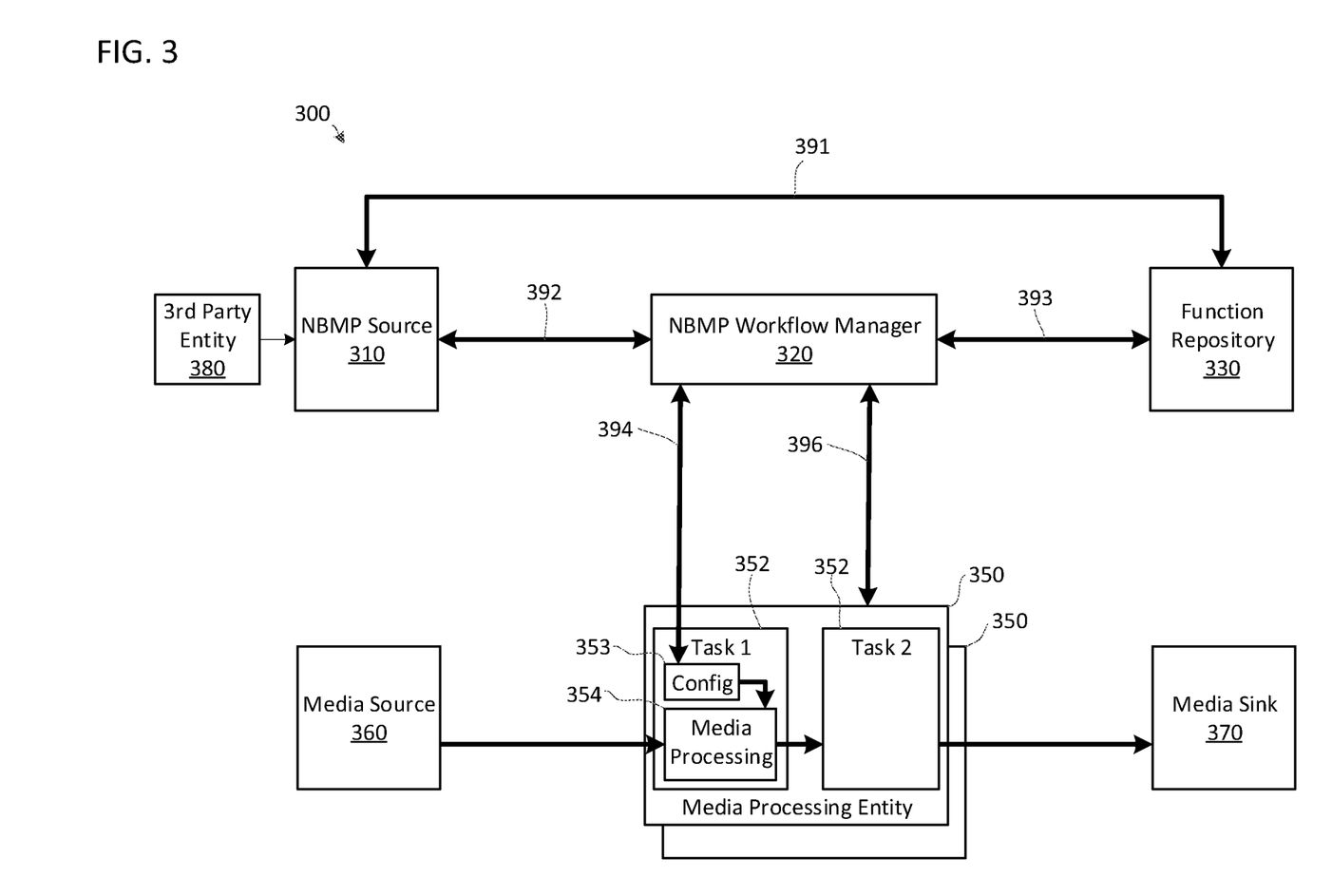
FIG. 3 is a block diagram of an NBMP system, according to embodiments.

In an embodiment of the present disclosure, an NBMP system 300 is provided. With reference to FIG. 3, the NBMP system 300 comprises an NBMP source 310, an NBMP workflow manager 320, a function repository 330, one or more media processing entities 350, a media source 360, and a media sink 370.

The NBMP source 310 may receive instructions from a third party entity 380, may communicate with the NBMP workflow manager 320 via an NBMP workflow API 392, and may communicate with the function repository 330 via a function discovery API 391. For example, the NBMP source 310 may send a workflow description document(s) (WDD) to the NBMP workflow manager 320, and may read the function description of functions stored in the function repository 330, the functions being media processing functions stored in memory of the function repository 330 such as, for example, functions of media decoding, feature point extraction, camera parameter extraction, projection method, seam information extraction, blending, post-processing, and encoding. The NBMP source 310 may comprise or be implemented by at least one processor and memory that stores code configured to cause the at least processor to perform the functions of the NBMP source 310.

The NBMP source 310 may request the NBMP workflow manager 320 to create workflow including tasks 352 to be performed by the one or more media processing entities 350 by sending the workflow description document, which may include several descriptors, each of which may have several parameters.

For example, the NBMP source 310 may select functions stored in the function repository 330 and send the workflow description document to the NBMP workflow manager 320 that includes a variety of descriptors for description details such as input and output data, required functions, and requirements for the workflow. The workflow description document may include a set of task descriptions and a connection map of inputs and outputs of tasks 352 to be performed by one or more of the media processing entities 350. When the NBMP workflow manager 320 receives such information from the NBMP source 310, the NBMP workflow manager 320 may create the workflow by instantiating the tasks based on function names and connecting the tasks in accordance with the connection map.

Alternatively or additionally, the NBMP source 310 may request the NBMP workflow manager 320 to create workflow by using a set of keywords. For example, NBMP source 310 may send the NBMP workflow manager 320 the workflow description document that may include a set of keywords that the NBMP workflow manager 320 may use to find appropriate functions stored in the function repository 330. When the NBMP workflow manager 320 receives such information from the NBMP source 310, the NBMP workflow manager 320 may create the workflow by searching for appropriate functions using the keywords that may be specified in a Processing Descriptor of the workflow description document, and use the other descriptors in the workflow description document to provision tasks and connect them to create the workflow.

The NBMP workflow manager 320 may communicate with the function repository 330 via a function discovery API 393, which may be a same or different API from the function discovery API 391, and may communicate with one or more of the media processing entities 350 via an NBMP task API 394. The NBMP workflow manager 320 may also communicate with one or more of the media processing entities 350 via a media processing entity (MPE) API 396. The NBMP workflow manager 320 may comprise or be implemented by at least one processor and memory that stores code configured to cause the at least processor to perform the functions of the NBMP workflow manager 320.

The NBMP workflow manager 320 may use the NBMP task API 394 to setup, configure, manage, and monitor one or more tasks 352 of a workflow that is performable by the one or more media processing entities 350. In an embodiment, the NBMP workflow manager 320 may use the NBMP task API 394 to update and destroy the tasks 352. In order to configure, manage, and monitor tasks 352 of the workflow, the NBMP workflow manager 320 may send messages, such as requests, to one or more of the media processing entities 350, wherein each message may have several descriptors, each of which have several parameters. The tasks 352 may each include media processing functions 354 and configurations 353 for the media processing functions 354.

In an embodiment, after receiving a workflow description document from the NBMP source 310 that does not include a list of the tasks (e.g., includes a list of keywords instead of a list of tasks), the NBMP workflow manager 320 may select the tasks based on the descriptions of the tasks in the workflow description document to search the function repository 330, via the function discovery API 393, to find the appropriate functions to run as tasks 352 for a current workflow. For example, the NBMP workflow manager 320 may select the tasks based on keywords provided in the workflow description document. After the appropriate functions are identified by using the keywords or the set of task descriptions that is provided by the NBMP source 310, the NBMP workflow manager 320 may configure the selected tasks in the workflow by using the NBMP task API 394. For example, the NBMP workflow manager 320 may extract configuration data from information received from the NBMP source, and configure the tasks 352 based on the configuration data.

The one or more media processing entities 350 may be configured to receive media content from the media source 360, process the media content in accordance with the workflow, that includes tasks 352, created by the NBMP workflow manager 320, and output the processed media content to the media sink 370. The one or more media processing entities 350 may each comprise or be implemented by at least one processor and memory that stores code configured to cause the at least processor to perform the functions of the media processing entities 350.

The media source 360 may include memory that stores media and may be integrated with or separate from the NBMP source 310. In an embodiment, the NBMP workflow manager 320 may notify the NBMP source 310 when a workflow is prepared and the media source 360 may transmit media content to the one or more of the media processing entities 350 based on the notification that the workflow is prepared.

The media sink 370 may comprise or be implemented by at least one processor and at least one display that is configured to display the media that is processed by the one or more media processing entities 350.

The third party entity 380 may comprise or be implemented by at least one processor and memory that stores code configured to cause the at least processor to perform the functions of the third party entity 380.

As discussed above, messages from the NBMP Source 310 (e.g., a workflow description document for requesting creation of a workflow) to the NBMP workflow manager 320, and messages (e.g., for causing the workflow to be performed) from the NBMP workflow manager 320 to the one or more media processing entities 350 may include several descriptors, each of which may have several parameters. In cases, communication between any of the components of the NBMP system 300 using an API may include several descriptors, each of which may have several parameters.

Embodiments of the present disclosure define scheduling schemes for scheduling the execution of a workflow or parts of it. Embodiments of the present disclosure extend the NBMP standard to support scheduling the workflow using any of these schemes.

Figure 4:
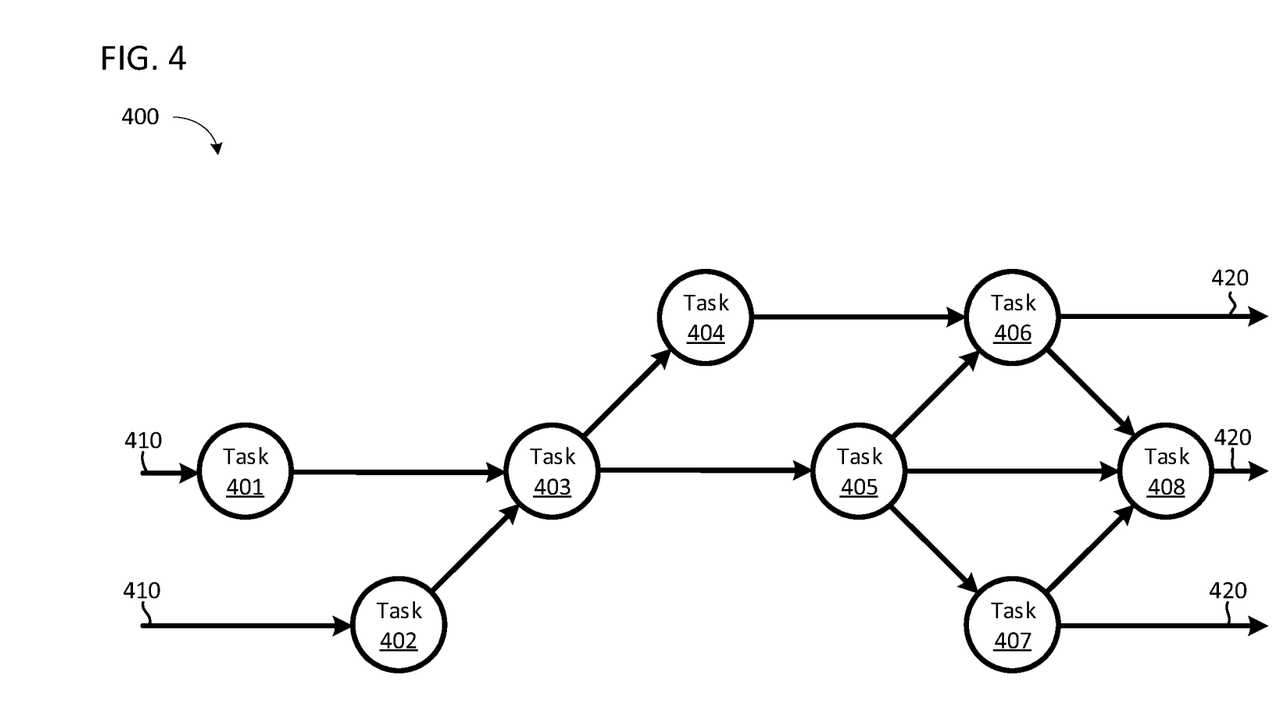
FIG. 4 is a diagram of an example NBMP workflow according to embodiments.

With reference to FIG. 4, a non-limiting example of an NBMP workflow is described below. According to embodiments, the NBMP workflow manager 320 may create and manage an NBMP workflow 400 that includes one or more tasks (e.g., tasks 401-408). For example, as shown in FIG. 4, the tasks 401-408 may be associated with various inputs 410 and may be configured to provide various outputs 420. The inputs 410 on the left edge of FIG. 4 (e.g., inputs of tasks 401-402) are inputs of the NBMP workflow 400. The outputs 420 on the right edge of FIG. 4 (e.g., outputs of tasks 406-408) are outputs of the NBMP workflow 400.

According to embodiments, the tasks of a workflow may be implemented in one or more media processing entities 350, the media source 360 and/or the media sink 370. In embodiments, the media source 360 may be a source device/platform, the one or more media processing entities 350 may be a cloud node/edge network, and the media sink 370 may be a sink device/platform.

Embodiments of the present disclosure may implement the following schemes for each task:
1. By order: each task is run once for its entire inputs and then the next task is run.
2. By duration: each task in the workflow is run such that one duration of input/output is consumed/produced, e.g., 1 minutes of inputs, or 5 minutes of output(s).
3. By event: each task is run with a start event and stops with a stop event.
4. By timeslot: each task starts according to a specific schedule.

The above schemes can be run for a group of tasks (or a task group). Schemes 2-4 can be run for the entire workflow. The schemes are described in more detail below.

[Scheme 1: By Order]

In the by order scheme mode, the NBMP workflow manager 320 may be required to run each task at a time. Therefore, the NBMP workflow manager 320 may be required to start from tasks that have the input(s) of the workflow, generate the outputs of such tasks, buffer them, and then start the next tasks in a moving wave fashion toward the outputs of the workflow. According to embodiments, there are two possibilities in such scheme:
1. The NBMP client defines the order of tasks to perform
2. The NBMP workflow manager 320 infers the order.

In both cases, the NBMP workflow manager 320 may reconfigure the workflow by adding buffer/storage for each output of the task. The NBMP workflow manager 320 may either have the information about the maximum size of these buffers/storages, or obtain each input size so that the NBMP workflow manager 320 estimates the size of buffer/storage.

According to embodiments, a "complete" input may be useful since every task receiving a "true" flag at its "complete" input knows that its task is completed and can generate an event for the NBMP workflow manager 320 indicating that it is the time of the next task.

According to embodiments, in implementing the by order scheme or other schemes, an NBMP client may send (e.g., to the NBMP workflow manager 320) information signaling a scheme mode (e.g., the order scheme), and a maximum size of storage for each output in workflow or maximum size of the inputs. According to embodiments, the NBMP client may also send information signaling an order of tasks. According to embodiments, the NBMP client may be an NBMP source 310.

According to embodiments, in implementing the by order scheme or other schemes, the NBMP workflow manager 320 may send (e.g., to the NBMP client) information signaling the capabilities of the NBMP workflow manager 320. For example, such information may indicate (a) whether the NBMP workflow manager 320 supports the scheme mode, (b) whether the NBMP workflow manager 320 can derive the order of tasks, and/or (c) whether the NBMP workflow manager 320 can derive the required buffers sizes from input sizes.

According to embodiments, upon receiving a request (e.g., from the NBMP client), the NBMP workflow manager 320 may acknowledge (e.g., to the NBMP client) whether the NBMP workflow manager 320 may perform the request. According to embodiments, the request may be a request to perform schedule.

[Scheme 2: By Duration]

In the by duration scheme mode, the NBMP workflow manager 320 may be required to run each task for a specific duration of input or output. Therefore, the NBMP workflow manager 320 may be required to start from tasks that have the input(s) of the workflow, generate the outputs of such tasks for that duration, buffer them, and then start the next tasks in a moving wave fashion toward the output(s) of the workflow. According to embodiments, there are at least two possibilities in the by duration scheme:

1. The NBMP client defines the order of tasks to perform
2. The NBMP workflow manager 320 infers the order.

In both cases, the NBMP workflow manager 320 may reconfigure the workflow by adding buffer/storage for each output of the task. The NBMP workflow manager 320 may either have the information about the maximum size of these buffers/storages for a specific duration, or obtain each input size so that the NBMP workflow manager 320 estimates the size of buffer/storage.

According to embodiments, in implementing the by duration scheme or other schemes, the NBMP client may send (e.g., to the NBMP workflow manager 320) information signaling a scheme mode (e.g., the by duration scheme), a duration of input(s) or the required duration of the output(s), the order of tasks if needed and/or provided, and a maximum size of storage for each output in workflow or maximum size of the inputs.

According to embodiments, in implementing the by duration scheme or other schemes, the NBMP workflow manager 320 may send (e.g., to the NBMP client) information signaling the capabilities of the NBMP workflow manager 320. For example, such information may indicate (a) whether the NBMP workflow manager 320 supports the scheme mode, (b) whether the NBMP workflow manager 320 can derive the order of tasks, (c) whether the NBMP workflow manager 320 can derive the required buffers sizes from input sizes, and/or (d) whether the NBMP workflow manager 320 can derive the duration of inputs required for the generation of the given duration of the output(s).

According to embodiments, upon receiving a request (e.g., from the NBMP client), the NBMP workflow manager 320 may acknowledge (e.g., to the NBMP client) whether the NBMP workflow manager 320 may perform the request. According to embodiments, the request may be a request to perform tasks.

[Scheme 3: By Event]

In the by event scheme mode, the start and stop of each task may be triggered with an event. The events may be issued by the NBMP workflow manager 320. Since any task has a "run" state, the NBMP workflow manager 320 can start the task by changing the task's state to "run". To pause a task, the NBMP workflow manager 320 can change the task's state to "idle." However, the state of "idle" does not distinguish between the lack of input vs the request by NBMP workflow manager 320 to stay as "idle." Embodiments of the present disclosure may solve this problem by implementing a new state of "paused." According to embodiments, the NBMP workflow manager 320 can change a task's state from "run" to "paused." In the "paused" state, a task stays idle even if inputs are available.

According to embodiments, the NBMP workflow manager 320 can schedule events based on its own internal logic, or it can receive the events from the NBMP client. Since, in the by event scheme mode, the output buffers/storages of each task may be managed, embodiments of the present disclosure may include the following:

1. The NBMP client defines a maximum size of intermediate buffers/storages if the events are driven by the NBMP client.
2. The NBMP workflow manager 320 infers the maximum size if it schedules its own events.

According to embodiments, in implementing the by event scheme or other schemes, the NBMP client may send (e.g., to the NBMP workflow manager 320) information signaling a scheme mode (e.g., the by event scheme), if an event(s) is driven by the NBMP client or that the NBMP workflow manager 320 is to start its own event scheme, and a maximum of storage for each output in workflow if the event(s) is driven by the NBMP client.

According to embodiments, in implementing the by event scheme or other schemes, the NBMP workflow manager 320 may send (e.g., to the NBMP client) information signaling the capabilities of the NBMP workflow manager 320. For example, such information may indicate (a) whether the NBMP workflow manager 320 supports the scheme mode, and (b) whether the NBMP workflow manager 320 supports workflow (e.g., NBMP client) driven events.

According to embodiments, upon receiving a request (e.g., from the NBMP client), the NBMP workflow manager 320 may acknowledge (e.g., to the NBMP client) whether the NBMP workflow manager 320 may perform the request. According to embodiments, the request may be a request to perform tasks.

According to embodiments, in implementing the by event scheme or other schemes, a task (or at least one processor implementing the task) may send (e.g., to the NBMP client and/or the NBMP workflow manager 320), whether the task supports the "paused" state, and/or whether the task may be changed from the "run" state to the "paused" state.

[Scheme 4: By Timeslot]

In the by timeslot scheme mode, the NBMP client may provide a schedule for each task to the NBMP workflow manager 320 and the NBMP workflow manager 320 may run each task according to the schedule (e.g., according to a given timeslot in the schedule).

According to embodiments, since intermediate buffers/ storage may need to be allocated, the NBMP client may define the size of buffers.

According to embodiments, in implementing the by timeslot scheme or other schemes, the NBMP client may send (e.g., to the NBMP workflow manager 320) information signaling a scheme mode (e.g., the by timeslot scheme), the scheduling mode of each task, and a maximum size of storage for each output in workflow or maximum size of the inputs. According to embodiments, the scheduling mode of each task may be indicated as "explicit" or "indexed." The scheduling mode of "explicit" indicates that the schedule has exact times. The scheduling mode of "indexed" indicates that a start, end, increment, and/or duration scheme (e.g., a "for" loop) is used to indicate a timeslot for a task(s).

According to embodiments, in implementing the timeslot scheme or other schemes, the NBMP workflow manager 320 may send (e.g., to the NBMP client) information signaling the capabilities of the NBMP workflow manager 320. For example, such information may indicate (a) whether the NBMP workflow manager 320 supports the scheme mode, and (b) whether the NBMP workflow manager 320 supports a scheduling mode(s) (e.g., the explicit mode and/or the indexed mode).

According to embodiments, upon receiving a request (e.g., from the NBMP client), the NBMP workflow manager 320 may acknowledge (e.g., to the NBMP client) whether the NBMP workflow manager 320 may perform the request. According to embodiments, the request may be a request to perform tasks.

[Implementation in NBMP]

According to embodiments, a scale descriptor may be implemented in NBMP to address the scheduling of a workflow.

The scale descriptor may include the parameters shown below in TABLE 1.

TABLE 1

| Scale Descriptor | | |
| --- | --- | --- |
| Parameter Name | Type | Cardinality |
| id | P | 1 |
| description | P | 0-1 |
| schedule-type | P | 0-1 |
| order | Array of string | 0-1 |
| duration | P | 0-1 |
| number-of-segments | P | 0-1 |
| io-flag | P | 0-1 |
| run-mode | P | 0-1 |
| timeslot | O | 0-1 |
| status | P | 1 |

The "timeslot" object may include the parameters shown below in TABLE 2.

TABLE 2

| Timeslot Object | | |
| --- | --- | --- |
| Parameter Name | Type | Cardinality |
| mode | P | 1 |
| explicit | Array of objects | 0-1 |
| start | P | 0-1 |
| end | P | 0-1 |
| increment | P | 0-1 |
| duration | P | 0-1 |
| timescale | P | 0-1 |

The "explicit" object may include the parameters shown below in TABLE 3.

TABLE 3

| Explicit Object | | |
| --- | --- | --- |
| Parameter Name | Type | Cardinality |
| start | P | 1 |
| end | P | 1 |

According to embodiments, the scale descriptor may include the scale parameters shown below in TABLE 4.

TABLE 4

| Scale Parameters | | | | |
| --- | --- | --- | --- | --- |
| Name | Definition | Unit | Type | Valid range |
| id | unique string indicating the schedule request in the scope of Workflow | N/A | string | N/A |
| description | a human-readable description for the schedule request | N/A | string | N/A |
| schedule-type | type of schedule request, which may have one of the following values: (a) "order": with a specific order (b) "duration": with a specific order and for a specific duration (c) "segment": for a specific number of segments (d) "event": event-driven (e) "timeslot": with a given timeslot schedule The default value may be "order." | N/A | string | N/A |
| order | The list of task IDs in the order of execution for "schedule-type" = "order" or "schedule-type" = "duration" or "schedule-type" = "segment" | N/A | string | N/A |
| duration | The duration of inputs/outputs in unit of the timescale for "schedule-type" = "duration" | ticks | unsigned integer | N/A |
| timescale | The number of ticks per second used for the duration unit for "schedule-type" = "duration" | N/A | unsigned integer | N/A |
| number-of-segments | The number of inputs/outputs segments to be processed for "schedule-type" = "segment" | N/A | unsigned integer | Non zero |
| io-flag | If "TRUE", then the duration or number of steps are for the outputs, otherwise they are for the inputs, for "schedule-type" = "duration" or "schedule-type" = "segment" The default value may be "FALSE." | N/A | boolean | N/A |

TABLE 4-continued

Scale Parameters

| Name | Definition | Unit | Type | Valid range |
|---|---|---|---|---|
| run-mode | The state change when "schedule-type" = "event", which may have one of the following values: (a) "run": change to the "run" state. (b) "pause": change to the "pause" state | N/A | string | N/A |
| status | Status of the schedule request, which may include one of the following values: (a) "capabilities": request the capabilities (b) "consider": investigate whether such schedule is possible to accommodate (c) "request": request scheduling (d) "passed": accommodated/possible to accommodate (e) "failed": failed/not possible The default value may be "failed" | N/A | string | N/A |
| mode | timeslot mode, which may have one of the following values: (a) "explicit": explicit schedule with specific start and end time (b) "indexed": implicit by defining start, end, increments, and/or duration. The default value may be "explicit." | N/A | string | N/A |
| start | Start time of the timeslot for the task in "run" mode. | | | |
| end | end time of the timeslot for the task in "run" mode. | | | |
| increment | The increments of time to the next start time in the scale of "timescale" | N/A | unsigned integer | N/A |
| duration | The duration of time for this increment, in the scale of "timescale" | N/A | unsigned integer | N/A |

According to embodiments, the NBMP client can include the scale descriptor in a workflow description document (WDD) update call for the following functions: (a) get capabilities of workflow manager 320 by including the scale descriptor in the WDD, wherein "status" parameter has a value equal to "capabilities"; (b) schedule the workflow by including the scale descriptor in the WDD; (c) schedule a task by including the scale descriptor in a task description document (TDD); (d) schedule a group of tasks by including the scale descriptor in a Task group object; and (e) consider scheduling any of the above by sending a request that includes the scale description, wherein the "status" parameter has a value equal to "consider" to see if the NBMP workflow manager 320 can manage the schedule if the NBMP workflow manager 320 is requested to do so.

According to embodiments, to perform the above functions (and/or other functions), the NBMP client can obtain (e.g., create or update) the WDD and then send the WDD and/or TDD, that includes the scale descriptor, to the NBMP workflow manager 320. According to embodiments, the NBMP workflow manager 320 may, for example, perform functions such as sending its capabilities to the NBMP client, scheduling a workflow, scheduling a task, scheduling a group of tasks, or indicating to the NBMP client whether it can manage a schedule, based on values of parameters included in the scale descriptor of the WDD and/or TDD that is received. For example, the NBMP workflow manager 320 may obtain the ID of a schedule request in the scope of a workflow, a description of the schedule request, a type of the schedule request, a list of task IDs in an order of execution, a duration of inputs/outputs, a time scale, a number of inputs/outputs segments to be processed, an io-flag, a run mode of a task(s), a status of the schedule request, a timeslot mode, a state time of the timeslot for a task(s), an end time for the timeslot for the task(s), a time increment to the next start time, and/or a duration of time for the time increment, and performs its functions (e.g., scheduling/managing a workflow) based thereon.

According to embodiments, a method may be provided that includes describing various scheduling schemes for executing parts of an entire workflow on a cloud platform. The scheduling schemes may include modes of scheduling by a specific order of tasks, scheduling by duration limited order of tasks, scheduling by events, or scheduling by explicit or implicit specific scheduling of each task. The various scheduling schemes may be described in a descriptor that describes the schedule type, the information regarding a specific type of schedule, and one or more commands. In the descriptor, a new paused state may be indicated for any number of tasks defined wherein the paused stated indicates that the task maintains its internal state and information while not processing any further data. In the descriptor, the commands can be requests for, for example, getting the capabilities of the cloud platform, checking whether scheduling can be implemented, or requesting scheduling to be implemented. The descriptor may also include a response(s) to the request(s).

According to embodiments of the present disclosure, at least one processor with memory storing computer code may be provided. The computer code may be configured to, when executed by the at least one processor, perform any number of aspects of the present disclosure.

Figure 5:
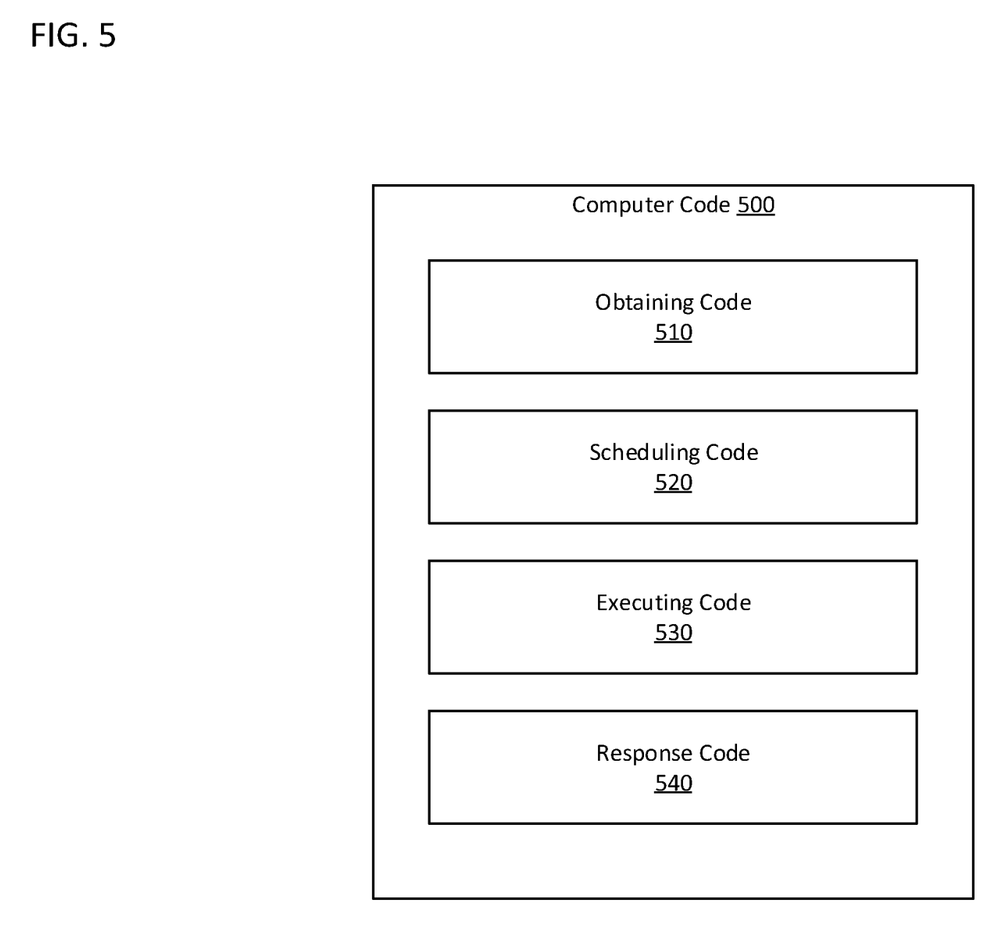
FIG. 5 is a block diagram of computer code according to embodiments.

For example, with reference to FIG. 5, computer code 500 may be implemented in the NBMP system 300. For example, the computer code may be stored in memory of the NBMP workflow manager 320 and may be executed by at least one processor of the NBMP workflow manager 320. The compute code may comprise, for example, obtaining code 510, scheduling code 520, executing code 530, and response code 540.

The obtaining code 510 may be configured to cause the NBMP workflow manager 320 to obtain information from a WDD or TDD. For example, the NBMP workflow manager 320 may receive the WDD or TDD, and any number of the scale parameters (e.g., refer to TABLE 4) therein may be signaled to the NBMP workflow manager 320 such that the NBMP workflow manager 320 obtains corresponding information. For example, the NBMP workflow manager 320 may obtain the ID of a schedule request in the scope of a workflow, a description of the schedule request, a type of the schedule request, a list of task IDs in an order of execution, a duration of inputs/outputs, a time scale, a number of inputs/outputs segments to be processed, an io-flag, a run mode of a task(s), a status of the schedule request, a timeslot mode, a state time of the timeslot for a task(s), an end time for the timeslot for the task(s), a time increment to the next start time, and/or a duration of time for the time increment. According to embodiments, the NBMP workflow manager 320 may obtain a scheme mode for scheduling a media processing workflow.

The scheduling code 520 may be configured to cause the NBMP workflow manager 320 to schedule the workflow (including tasks therein) for execution based on the information obtained by the NBMP workflow manager 320. For example, the NBMP workflow manager 320 may schedule the workflow in accordance with the obtained scheme mode and based on any other information described in the present disclosure that is received by the NBMP workflow manager 320 from the NBMP client, including the other parameters of the scale descriptor. According to embodiments, the NBMP workflow manager 320 may infer aspects of the workflow, and its tasks, to be scheduled based on the information received by the NBMP workflow manager 320, and schedule the workflow accordingly. For example, the NBMP workflow manager 320 may infer an order of tasks, maximum size of intermediate buffers/storages, and/or a timeslot of a task(s).

The executing code 530 may be configured to cause the NBMP workflow manager 320 to cause the tasks of the workflow, as scheduled, to be implemented in one or more media processing entities 350, the media source 360 and/or the media sink 370.

The response code 540 may be configured to cause the NBMP workflow manager 320 to send, to the NBMP client, a response to a request received from the NBMP client. According to embodiments, the request may be included in the scale descriptor of the WDD or the TDD. According to embodiments, the request may be to: (a) get capabilities of workflow manager 320 by including the scale descriptor in the WDD, wherein "status" parameter has a value equal to "capabilities"; (b) schedule the workflow by including the scale descriptor in the WDD; (c) schedule a task by including the scale descriptor in a task description document (TDD); (d) schedule a group of tasks by including the scale descriptor in a Task group object; and (e) consider scheduling any of the above by sending a request that includes the scale description, wherein the "status" parameter has a value equal to "consider" to see if the NBMP workflow manager 320 can manage the schedule if the NBMP workflow manager 320 is requested to do so. In addition to performing the request, the NBMP workflow manager 320 may provide a corresponding response to the NBMP client. For example, the response may indicate (a) whether the NBMP workflow manager 320 supports the scheme mode, (b) whether the NBMP workflow manager 320 can derive the order of tasks, (c) whether the NBMP workflow manager 320 can derive the required buffers sizes from input sizes, (d) whether the NBMP workflow manager 320 can derive the duration of inputs required for the generation of the given duration of the output(s), (e) whether the NBMP workflow manager 320 supports workflow (e.g., NBMP client) driven events, (0 whether the NBMP workflow manager 320 supports a scheduling mode(s) (e.g., the explicit mode and/or the indexed mode), (g) whether the NBMP workflow manager 320 can accommodate a requested schedule, and/or whether the NBMP workflow manager 320 can or did perform a particular request.

According to one or more embodiments, embodiments of the present disclosure may be implemented in environments different from NBMP.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or described in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method performed by at least one processor that implements a network-based media processing (NBMP) workflow manager, the method comprising:
    sending, to an NBMP client, first information indicating that the NBMP workflow manager supports a scheme mode for scheduling an NBMP workflow;
    receiving, from the NBMP client, second information indicating the scheme mode for scheduling the NBMP workflow;
    obtaining the scheme mode based on the second information;
    scheduling tasks of the NBMP workflow to be executed to process media in accordance with the scheme mode indicated in the second information,
    wherein the scheme mode indicated in the second information and indicated to be supported by the NBMP workflow manager in the first information is:
        a first scheme mode in which each task of the NBMP workflow is executed once for an entirety of an input of the task,
        a second scheme mode in which each task of the NBMP workflow is executed for a predetermined duration of the input of the task or for a predetermined duration of an output of the task,
        a third scheme mode in which each task of the NBMP workflow is started based on a start event or stopped based on a stop event, or
        a fourth scheme mode in which each task of the NBMP workflow is started according to a predetermined schedule, wherein the predetermined schedule includes time slots for executing the tasks; and
    performing the scheduled tasks of the NBMP workflow, wherein
    the scheme mode indicated in the second information, and indicated to be supported by the NBMP workflow manager in the first information, is the first scheme mode,
    the receiving the second information comprises, receiving, from the NBMP client, a syntax element with a first value indicating the first scheme mode for scheduling a first plurality of tasks of the NBMP workflow, the first value being the second information,
    the method further comprises:
        receiving, from the NBMP client, the syntax element with a second value indicating the second scheme mode for scheduling a second plurality of tasks of the NBMP workflow;

scheduling the second plurality of tasks of the NBMP workflow to be executed to process media in accordance with the second scheme mode indicated by the second value;

receiving, from the NBMP client, the syntax element with a third value indicating the third scheme mode for scheduling a third plurality of tasks of the NBMP workflow;

scheduling the third plurality of tasks of the NBMP workflow to be executed to process media in accordance with the third scheme mode indicated by the third value;

receiving, from the NBMP client, the syntax element with a fourth value indicating the fourth scheme mode for scheduling a fourth plurality of tasks of the NBMP workflow;

scheduling the fourth plurality of tasks of the NBMP workflow to be executed to process media in accordance with the fourth scheme mode indicated by the fourth value, and the first value, the second value, the third value, and the fourth value of the syntax element are different values from each other.

2. The method of claim 1, wherein
the sending comprises sending, to the NBMP client, the first information that indicates that the NBMP workflow manager supports the scheme mode, based on receiving a workflow description document (WDD) from the NBMP client that includes a parameter that has a value that indicates that capabilities of the NBMP workflow manager are requested.

3. The method of claim 1, wherein
the method further comprises scheduling the NBMP workflow based on receiving a workflow description document (WDD) that includes third information indicating the NBMP workflow, or
the method further comprises scheduling a group of tasks based on receiving a task group object that indicates the group of tasks, or
the scheduling the tasks comprises scheduling a task based on receiving a task description document (TDD) that indicates the task.

4. The method of claim 1, further comprises:
sending, to the NBMP client, third information indicating whether the NBMP workflow manager can schedule the NBMP workflow, a group of tasks, or a task, based on receiving a parameter from the NBMP client that has a value that indicates that the NBMP client requests to investigate whether the NBMP workflow manager can accommodate scheduling of the NBMP workflow, the group of tasks, or the task.

5. The method of claim 1, wherein
the scheme mode indicated in the second information, and indicated to be supported by the NBMP workflow manager in the first information, is the third scheme mode.

6. The method of claim 5, further comprising:
obtaining the start event or the stop event by:
receiving additional information indicating the start event or the stop event, or
generating the start event or the stop event,
wherein the scheduling the tasks of the NBMP workflow comprises scheduling at least one of the tasks of the NBMP workflow to be started based on the start event that is obtained or stopped based on the stop event that is obtained.

7. The method of claim 5, wherein the scheduling the tasks of the NBMP workflow comprises changing a state of at least one of the tasks of the NBMP workflow to a paused state.

8. The method of claim 1, wherein
the scheme mode indicated in the second information, and indicated to be supported by the NBMP workflow manager in the first information, is the fourth scheme mode.

9. The method of claim 8, further comprising receiving additional information indicating a scheduling mode of at least one task of the NBMP workflow,
wherein the scheduling mode is one from among:
a first scheduling mode that indicates that a timeslot of the at least one task within the predetermined schedule is explicitly signaled to the NBMP workflow manager, or
a second scheduling mode that indicates that the NBMP workflow manager obtains the timeslot through inference.

10. A system comprising:
at least one memory configured to store computer program code; and
at least one processor configured to access the computer program code and operate as instructed by the computer program code, the computer program code comprising:
sending code configured to cause a network-based media processing (NBMP) workflow manager, implemented by the at least one processor, to send first information indicating that the NBMP workflow manager supports a scheme mode for scheduling an NBMP workflow;
obtaining code configured to cause the NBMP workflow manager to obtain the scheme mode for scheduling the NBMP workflow, the scheme mode obtained based on received second information, from the NBMP client, that indicates the scheme mode; and
scheduling code configured to cause the NBMP workflow manager to schedule tasks of the NBMP workflow to be executed to process media in accordance with the scheme mode indicated in the received second information,
wherein the scheme mode indicated in the received second information and indicated to be supported by the NBMP workflow manager in the first information is:
a first scheme mode in which each task of the NBMP workflow is executed once for an entirety of an input of the task,
a second scheme mode in which each task of the NBMP workflow is executed for a predetermined duration of the input of the task or for a predetermined duration of an output of the task,
a third scheme mode in which each task of the NBMP workflow is started based on a start event or stopped based on a stop event, or
a fourth scheme mode in which each task of the NBMP workflow is started according to a predetermined schedule, wherein the predetermined schedule includes time slots for executing the tasks, wherein
the scheme mode indicated in the second information, and indicated to be supported by the NBMP workflow manager in the first information, is the first scheme mode,
the receiving the second information comprises, receiving, from the NBMP client, a syntax element with a first value indicating the first scheme mode for scheduling a first plurality of tasks of the NBMP workflow, the first value being the second information, the processor is further configured to access the computer program code and operate as instructed by the computer program code to implement:

receiving, from the NBMP client, the syntax element with a second value indicating the second scheme mode for scheduling a second plurality of tasks of the NBMP workflow;

scheduling the second plurality of tasks of the NBMP workflow to be executed to process media in accordance with the second scheme mode indicated by the second value;

receiving, from the NBMP client, the syntax element with a third value indicating the third scheme mode for scheduling a third plurality of tasks of the NBMP workflow;

scheduling the third plurality of tasks of the NBMP workflow to be executed to process media in accordance with the third scheme mode indicated by the third value;

receiving, from the NBMP client, the syntax element with a fourth value indicating the fourth scheme mode for scheduling a fourth plurality of tasks of the NBMP workflow;

scheduling the fourth plurality of tasks of the NBMP workflow to be executed to process media in accordance with the fourth scheme mode indicated by the fourth value, and the first value, the second value, the third value, and the fourth value of the syntax element are different values from each other.

11. The system of claim 10, wherein the sending code is further configured to cause the NBMP workflow manager to send, to the NBMP client, the first information that indicates that the NBMP workflow manager supports the scheme mode, based on receiving a workflow description document (WDD) from the NBMP client that includes a parameter that has a value that indicates that capabilities of the NBMP workflow manager are requested.

12. The system of claim 10, wherein the scheduling code is further configured to cause the NBMP workflow manager to:

schedule the NBMP workflow based on receiving a workflow description document (WDD) that includes third information indicating the NBMP workflow; or schedule a group of tasks based on receiving a task group object that indicates the group of tasks; or schedule a task based on receiving a task description document (TDD) that indicates the task.

13. The system of claim 10, wherein the computer program code further comprises:

response code configured to cause the NBMP workflow manager to send, to the NBMP client, third information indicating whether the NBMP workflow manager can schedule the NBMP workflow, a group of tasks, or a task, based on receiving a parameter from the NBMP client that has a value that indicates that the NBMP client requests to investigate whether the NBMP workflow manager can accommodate scheduling of the NBMP workflow, the group of tasks, or the task.

14. The system of claim 10, wherein the scheme mode indicated in the received second information, and indicated to be supported by the NBMP workflow manager in the first information, is the third scheme mode.

15. The system of claim 14, wherein the start event or the stop event is obtained by the NBMP workflow manager.

16. The system of claim 14, wherein the scheduling code is further configured to cause the NBMP workflow manager to change a state of at least one of the tasks of the NBMP workflow to a paused state.

17. The system of claim 10, wherein the scheme mode indicated in the received second information, and indicated to be supported by the NBMP workflow manager in the first information, is the fourth scheme mode.

18. The system of claim 17, wherein the scheduling code is further configured to cause the NBMP workflow manager to schedule at least one task of the NBMP workflow to be executed in accordance with a scheduling mode that is indicated by additional information received by the NBMP workflow manager, wherein the scheduling mode is one from among:
  a first scheduling mode that indicates that a timeslot of the at least one task within the predetermined schedule is explicitly signaled to the NBMP workflow manager, or
  a second scheduling mode that indicates that the NBMP workflow manager obtains the timeslot through inference.

19. A non-transitory computer-readable medium storing computer code that is configured to, when executed by at least one processor, cause the at least one processor to implement a network-based media processing (NBMP) workflow manager that:

sends, to an NBMP client, first information indicating that the NBMP workflow manager supports a scheme mode for scheduling an NBMP workflow;

obtains the scheme mode for scheduling the NBMP workflow, the scheme mode obtained based on received second information, from the NBMP client, that indicates the scheme mode; and schedules tasks of the NBMP workflow to be executed to process media in accordance with the scheme mode indicated in the received second information, wherein the scheme mode indicated in the received second information and indicated to be supported by the NBMP workflow manager in the first information is:

a first scheme mode in which each task of the NBMP workflow is executed once for an entirety of an input of the task, a second scheme mode in which each task of the NBMP workflow is executed for a predetermined duration of the input of the task or for a predetermined duration of an output of the task, a third scheme mode in which each task of the NBMP workflow is started based on a start event or stopped based on a stop event, or a fourth scheme mode in which each task of the NBMP workflow is started according to a predetermined schedule, wherein the predetermined schedule includes time slots for executing the tasks, wherein the scheme mode indicated in the second information, and indicated to be supported by the NBMP workflow manager in the first information, is the first scheme mode, the receiving the second information comprises, receiving, from the NBMP client, a syntax element with a first value indicating the first scheme mode for scheduling a first plurality of tasks of the NBMP workflow, the first value being the second information, the computer code that is configured to, when executed by at least one processor, cause the at least one processor to implement:

receiving, from the NBMP client, the syntax element with a second value indicating the second scheme mode for scheduling a second plurality of tasks of the NBMP workflow;

scheduling the second plurality of tasks of the NBMP workflow to be executed to process media in accordance with the second scheme mode indicated by the second value;

receiving, from the NBMP client, the syntax element with a third value indicating the third scheme mode for scheduling a third plurality of tasks of the NBMP workflow;

scheduling the third plurality of tasks of the NBMP workflow to be executed to process media in accordance with the third scheme mode indicated by the third value;

receiving, from the NBMP client, the syntax element with a fourth value indicating the fourth scheme mode for scheduling a fourth plurality of tasks of the NBMP workflow;

scheduling the fourth plurality of tasks of the NBMP workflow to be executed to process media in accordance with the fourth scheme mode indicated by the fourth value, and the first value, the second value, the third value, and the fourth value of the syntax element are different values from each other.

* * * * *